(12) United States Patent
Flynn et al.

(10) Patent No.: US 7,519,569 B1
(45) Date of Patent: Apr. 14, 2009

(54) SYSTEM, APPARATUS, AND METHOD TO DYNAMICALLY ALLOCATE RESOURCES

(75) Inventors: Thomas J. Flynn, Allen, TX (US);
Doris Y. Tamanaha, Fullerton, CA (US)

(73) Assignee: Raytheon Company, Waltham, MA (US)

( * ) Notice: Subject to any disclaimer, the term of this patent is extended or adjusted under 35 U.S.C. 154(b) by 465 days.

(21) Appl. No.: 11/269,523

(22) Filed: Nov. 8, 2005

Related U.S. Application Data

(60) Provisional application No. 60/714,531, filed on Nov. 10, 2004.

(51) Int. Cl.
*G06N 5/00* (2006.01)
(52) U.S. Cl. .......................... 706/60; 706/45
(58) Field of Classification Search ............ 706/60, 706/45; 701/23
See application file for complete search history.

(56) References Cited

U.S. PATENT DOCUMENTS

| 6,842,674 | B2 * | 1/2005 | Solomon | 701/23 |
|---|---|---|---|---|
| 7,047,861 | B2 * | 5/2006 | Solomon | 89/1.11 |
| 7,142,971 | B2 | 11/2006 | Brown et al. | |
| 2006/0041345 | A1 | 2/2006 | Metcalf | |

OTHER PUBLICATIONS

Swanson; "Who is Using it in the Company?;" a single Raytheon internal slide; presented at the Lehman Select Industrial Conference on Feb. 4, 2004; presented at the Salomon smith Barney Conference on Mar. 8, 2004.

"C4ISR Presentations and Demonstrations;" slide presentation presented to LTG Benjamin S. Griffin, G-8 Programs, U.S. Army on May 6, 2003; 12 sheets.

Robinson; "The Global Information Grid, Net-Centric Services and the DOD's Data Strategy;" slide presentation dated Sep. 21, 2004; pp. 1-28.

"Global Information Grid Core Enterprise Services Strategy;" Office of the Assistant Secretary of Defence for Networks and Information Integration/DoD Chief Information Officer; Version 1.1a; Production Date Jul. 9, 2003; pp. 1-64.

NII Document Archives; internet website http//:www.defenselink.mil/nii/doc/; printed Jan. 25, 2005; 2 sheets.

Memorandum for Secretaries of the Military Departments; "The Department of Defense Architecture Framework (DoDAF);" dated Feb. 9, 2004; 2 sheets.

Memorandum for Secretaries of the Military Departments; "Department of Defense (DoD) Net-Centric Data Strategy: Visibility-Tagging and Advertising Data Assets with Discovery Metadata;" dated Oct. 24, 2003; 3 sheets.

(Continued)

*Primary Examiner*—Wilbert L Starks, Jr.
(74) *Attorney, Agent, or Firm*—Daly, Crowley, Mofford & Durkee, LLP

(57) ABSTRACT

A system, apparatus, and method to dynamically allocate resources provide full connectivity between elements. A common decision execution capability (CDEC) forms a centralized command and control function able to control the elements. The CDEC is adapted to generate virtual chains, each virtual chain a combination of the elements, to achieve an objective. The CDEC can select a virtual chain and either perform the selected virtual chain or generate a plan associated with the virtual chain.

45 Claims, 9 Drawing Sheets

OTHER PUBLICATIONS

Memorandum for the Record; "Global Information Grid Enterprise Services;" dated Nov. 12, 2003; document No. U18556-03; 3 sheets.
Memorandum for Secretaries of the Military Departments; "DoD Net-Centric Data Strategy;" dated May 9, 2003; 30 sheets.
DoD Architecture Framework Working Group; DoD Architecture Framework Version 1.0; vol. 1: Definitions and Guidelines; dated Feb. 9, 2004; i-iv & pp. ES1 to C4.
DoD Architecture Framework Working Group; DoD Architecture Framework Version 1.0; vol. II: Product Descriptions; dated Feb. 9, 2004; pp. i-xv & 1-1 to E-4.
DoD Architecture Framework Working Group; DoD Architecture Framework Version 1.0; Deskbook; dated Feb. 9, 2004; pp. i-xi & 1-1 to D-6.

* cited by examiner

SYSTEM, APPARATUS, AND METHOD TO DYNAMICALLY ALLOCATE RESOURCES

CROSS REFERENCE TO RELATED APPLICATIONS

This application claims the benefit under 35 U.S.C. §119 (e) of U.S. Provisional Application No. 60/714,531 filed Nov. 10, 2004, which application is incorporated herein by reference in its entirety.

STATEMENT REGARDING FEDERALLY SPONSORED RESEARCH

Not Applicable.

FIELD OF THE INVENTION

This invention relates generally to systems and methods to allocate resources, and, more particularly, to systems and methods to plan and dynamically allocate war-fighting and/or logistics resources associated with the military.

BACKGROUND OF THE INVENTION

There is growing desire to provide a greater military force using fewer military resources. Similarly, there is a desire to provide a maximum effect with limited force, a desire to fight in a non-linear fashion, (i.e., amount of force is not necessarily proportional to extent of enemy), a desire to influence a larger battlespace than is now possible, and a desire to be ready to fight in less time.

All of the above desires can be influenced by providing greater interoperability within and among the various branches of the U.S. military, including, but not limited to, the Army, Navy, Air Force, and Marines. The desires can be further influenced by providing greater interoperability not only within and among the various branches of the U.S. military, but also between the branches of the U.S. military and foreign national forces.

Interoperability within the various branches of the U.S. military has been addressed with various directives provided by the military branches, including, but not limited to, "The Army in 2020," a directive provided by the United States Army, "Sea Power 21," a directive provided by the United States Navy, "Operational Maneuver From the Sea," a directive provided by the United States Marines, and "Air Force Vision 2020" a directive provided by the United States Air Force. Interoperability between the various United States military branches has been addressed with other directives, for example, "Transformation Planning Guidance," a directive provided by the Department of Defense. Interoperability between the U.S. military branches and other national forces has been addressed by still other directives, for example, "Joint Vision 2020," a directive also provided by the Department of Defense.

As is known, in general, military operations can be described as having command, control, communications, and information ($C^3I$) functions. Command and control ($C^2$) functions are associated with military assets or weapons systems. For example, a communication can be made via a communications element (e.g., a radio) to a $C^2$ function (e.g., an aircraft pilot) adapted to receive the communication about an enemy target (e.g., from a satellite report), whereupon, the $C^2$ function can command a platform element (e.g., an aircraft), to attack the enemy target. Such an arrangement provides a "stovepiped" structure, wherein military systems are controlled by the $C^2$ function (e.g., a pilot) associated with each military system. The stovepiped structure limits interoperability.

Interoperability between and among the branches of the U.S. military as well as between the branches of the U.S. military and foreign national forces has been limited not only by the stovepiped communications structure, but also by a plethora of communication formats used among military systems, military branches, and foreign national forces. The U.S. military has attempted to address the large number of communication formats with a concept for a Joint Distribution Network (JDN), which still retains the great number of communication formats, but which can provide limited interoperability.

In order to establish a generally common communication format (a C part of the $C^3I$ structure described above), the U.S. military has generated a concept for a Global Information Grid (GIG), in which military systems, e.g., aircraft and ships, can communicate among the systems using a common digital data packet structure on a network. The GIG concept provides communications that flow only through the command and control functions in the military systems, which has a System of Systems or "SOS" orientation. This realizes interoperability primarily through message-based interchange. For example, the GIG can provide a structure for communication (C) to an aircraft pilot ($C^2$), who, based upon the communication, makes a decision to target an enemy location and to fire a missile. The GIG is merely a communications and information dissemination infrastructure, without regard to content of information that is communicated. The GIG is an operationally stovepiped arrangement as described above.

In order to provide the information (I) portion of the $C^3I$ structure, the U.S. Air Force has developed a concept for a Joint Battlespace Infosphere (JBI). The JBI can, for example, receive target and weather information from military systems and can make the information available to other military systems. In effect, the JBI provides an information repository available to military systems, e.g., aircraft. The JBI concept is gaining acceptance in other U.S. military service branches, but is not fully integrated into the GIG.

The U.S. military has not formulated a formal concept for integration of the GIG with the JBI. Furthermore, the U.S. military has provided only the stovepiped communication arrangement described above, requiring communications to flow through $C^2$ functions within each military system. Therefore, the military has not provided a concept for a fully integrated and interoperable structure, and therefore, has not fully achieved its desire for a greater military force using fewer military resources. Also, by not eliminating some human interfaces, for example, as described above in conjunction with description of the GIG, a military response suffers some delays.

Referring now to FIG. 1, a prior art architecture 10 includes systems 12-20, each adapted to communicate on the Global Information Grid (GIG) 24 described above. Each system can be, for example, a war-fighting system such as a ship or an airplane. Each system communicates by way of a communications "element" within a respective system. A communications element can be, for example, a radio. The system 12 communicates via a communications element, E1, the system 14 communicates via a communications element, E11, the system 16 communicates via a communications element, E13, the system 18 communicates via a communications element, E16, and the system 20 communicates via communications elements, E5 and E7. A system 22 is unable to communicate on the GIG 24, for example, because it has a communications element, E19, or a communications format, which is not compatible with the GIG 24. However, the system 22 may be intentionally isolated.

The joint battlespace infosphere (JBI) 26 is also coupled to the GIG and can provide a variety of types of data to any system coupled to the GIG 24 that requests or requires the data. For example, the data in the JBI 26 can include weather data, battle damage assessment data, enemy troop and enemy equipment locations, and friendly troop and friendly equipment locations. The system 22 is unable to access the JBI 26 because the system 22 is not able to communicate on the GIG 24. The system 22 may have its own self-contained data that may or may not be consistent with data in the JBI 26 at any instant of time.

Taking the system 12 as representative of others of the systems 14-20, the stovepipe arrangement will be apparent. Information is received by the communications element, E1, from the GIG 24, wherein the information is passed to the command and control element, E2. The command and control element provides instructions that are distributed to the other elements E3, E4 (elements that touch are indicative of information transfer). Therefore, all of the information must come through the $C^2$ element, E2, resulting in the stovepipe arrangement. Other elements, E3, E4 can be, for example, weapons or sensor elements. An element can also be representative of the platform itself, for example an airplane.

Logistics is a military function generally provided apart from actual war-fighting functions described in examples above. Logistics generally requires a substantial human interface, for example, to generate a contract to purchase missiles. However, it will be understood that the logistics function is related to the war-fighting functions. For example, if a large number of a particular type of missile is being used in combat by an air squadron, the planning function must order more missiles from a military contractor, and the logistics function must deliver more of the missiles to the air squadron. Current logistics functions are generally inefficient, dedicated by service branch, and are data and information starved, which can lead to material and personnel shortages.

SUMMARY OF THE INVENTION

The present invention provides a system, apparatus, and method to dynamically allocate resources having elements, providing full connectivity between the elements, and provides a common decision execution capability (CDEC) able to control the elements individually within a general pool of elements referred to herein as a "System of Elements." In the System of Elements, the elements may be dynamically configured into communities of elements that change over time to meet specific mission objectives.

In accordance with the present invention, a system includes a communications grid and two or more military systems, each of the two or more military systems having two or more war-fighting elements coupled to share information on the communications grid. War-fighting, as used herein, includes a spectrum of activities within peace, combat, and ranges thereof. The two or more war-fighting elements are selected from among a war-fighting communications element, a war-fighting sensor element, a war-fighting effector element, a war-fighting platform element, and a war-fighting command and control element. The war-fighting communications element is adapted to communicate war-fighting information on the communications grid, the war-fighting sensor element is adapted to communicate war-fighting sensor data on communications grid, the war-fighting effector element is adapted to communicate war-fighting information on the communications grid and to perform war-fighting functions in accordance with the war-fighting information, the war-fighting platform element is adapted to communicate war-fighting information on the communications grid and to move the war-fighting platform element in accordance with the war-fighting information, and the war-fighting command and control element is adapted to communicate war-fighting information on the communications grid and to perform war-fighting command and control functions local to a respective one of the two or more military systems in accordance with the war-fighting information. The system also includes a common-decision-execution-capability (CDEC) module coupled to communicate on the communications grid with selected ones of the two or more war-fighting elements. In some embodiments, the CDEC is a unified global capability that is implemented as a distributed and redundant (for robustness) capability.

In accordance with another aspect of the present invention, a system includes a communications grid and at least one of two or more military systems and one or more logistics systems.

Each of the two or more military systems has two or more war-fighting elements coupled to pass information on the communications grid. The two or more war-fighting elements are selected from among a war-fighting communications element, a war-fighting sensor element, a war-fighting effector element, a war-fighting platform element, and a war-fighting command and control element. The war-fighting communications element is adapted to communicate war-fighting information on the communications grid, the war-fighting sensor element is adapted to communicate war-fighting sensor data on communication grid, the war-fighting effector element is adapted to communicate war-fighting information on the communications grid and to perform a war-fighting function in accordance with the war-fighting information, the war-fighting platform element is adapted to communicate war-fighting information on the communication grid and to move the war-fighting platform element in accordance with the war-fighting information, and the war-fighting command and control element is adapted to communicate war-fighting information on the communication grid and to perform war-fighting command and control functions local to a respective one of the two or more military systems in accordance with the war-fighting information.

Each of the one or more logistics systems has one or more logistics elements coupled to communicate on the communication grid. The one or more logistics elements are selected from among a logistics communications element, a logistics sensor element, and a logistics effector element. The logistics sensor element is adapted to communicate logistics data on the communication grid and the logistics effector element is adapted to communicate logistics information on the communication grid, to receive material associated with ones of the two or more military systems, and to move the material in accordance with the received logistics information. The system also includes a common-decision-execution-capability module coupled to communicate on the communication grid to at least one of: selected ones of the two or more war-fighting elements and selected ones of the one or more logistics elements.

In accordance with another aspect of the present invention, a method includes receiving at least one of a rule, a constraint, an objective, and persistent situational awareness. The method also includes identifying a task in accordance with the rule, the constraint, the objective, and the persistent situational awareness. The method still further includes establishing a set of virtual chains associated with the identified task, rating two or more of the virtual chains in the set of virtual chains, resolving virtual chains from among the two or more virtual chains having the same rating, selecting a virtual chain to complete the task from among the two or more virtual chains, reserving a set of elements associated with the selected virtual chain, and performing the selected virtual chain to achieve the objective.

In accordance yet another aspect of the present invention, apparatus includes a war-fighting execution service having a war-fighting policy-driven execution module adapted to operate upon at least one of a war-fighting rule, a war-fighting constraint, a war-fighting objective, and a war-fighting persistent situational awareness, and to provide at least one war-fighting execution chain having a combination of war-fighting elements.

In accordance yet another aspect of the present invention, apparatus includes a logistics execution service comprising a logistics policy-driven execution module adapted to operate upon at least one of a logistics rule, a logistics constraint, a logistics objective, and a logistic persistent situational awareness, and to provide at least one logistics execution chain having a combination of logistics elements.

In accordance yet another aspect of the present invention, apparatus includes a planning service having at least one of: a war-fighting planning service having a war-fighting policy-driven planning module adapted to operate upon at least one of a war-fighting rule, a war-fighting constraint, a war-fighting objective, and a war-fighting persistent situational awareness, and to provide at least one war-fighting planning chain having a combination of war-fighting elements; and a logistics planning service having a logistics policy-driven planning module adapted to operate upon at least one of a logistics rule, a logistics constraint, a logistics objective, and a logistic persistent situational awareness, and to provide at least one logistics planning chain having a combination of logistics elements.

With this particular arrangement, the above system, method, and apparatus can provide a virtual chain of elements in order to implement an objective.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the system, apparatus, and method to dynamically allocate resources, some introductory concepts and terminology are explained. As used herein, a "system" refers to, but is not limited to, a tank, a truck, and airplane, and a soldier, each having one or more "elements."

As used herein, the term "element" refers to a class of physical objects. For example, a "platform" element refers to an asset that is able to move, such as an airplane, a truck, a tank, or a soldier. A "sensor" element refers to an object that is able to provide awareness of the environment, such as a radar, speed sensor, or weather sensor. An "effector" element refers to an object that is able to affect the environment (e.g., bring a combat force to bear), such as a missile, a gun, a flare, a propaganda leaflet, and a biological agent, for example, a virus. It may even be the absence of action. A "communications" element refers to an object that is able to communicate to other systems, such as a radio, a buss, or a computer. A "$C^2$" or "command and control" element refers to an object, e.g., a software application, a computer, or a person that can make command and control decisions and execute those decisions. Each of the five types of elements described above is often associated with a system, for example, a military system. The elements will be more fully described in conjunction with FIG. 4.

As used herein the term "network" is used to describe an electronic system on which data can be transmitted and received. The Internet is but one type of network, having particular communication methods and protocols. The invention described herein is not limited to any one type of network, and can include landline communications, wireless communications, and space communications. The network is further described in conjunction with FIG. 3.

Figure 2:
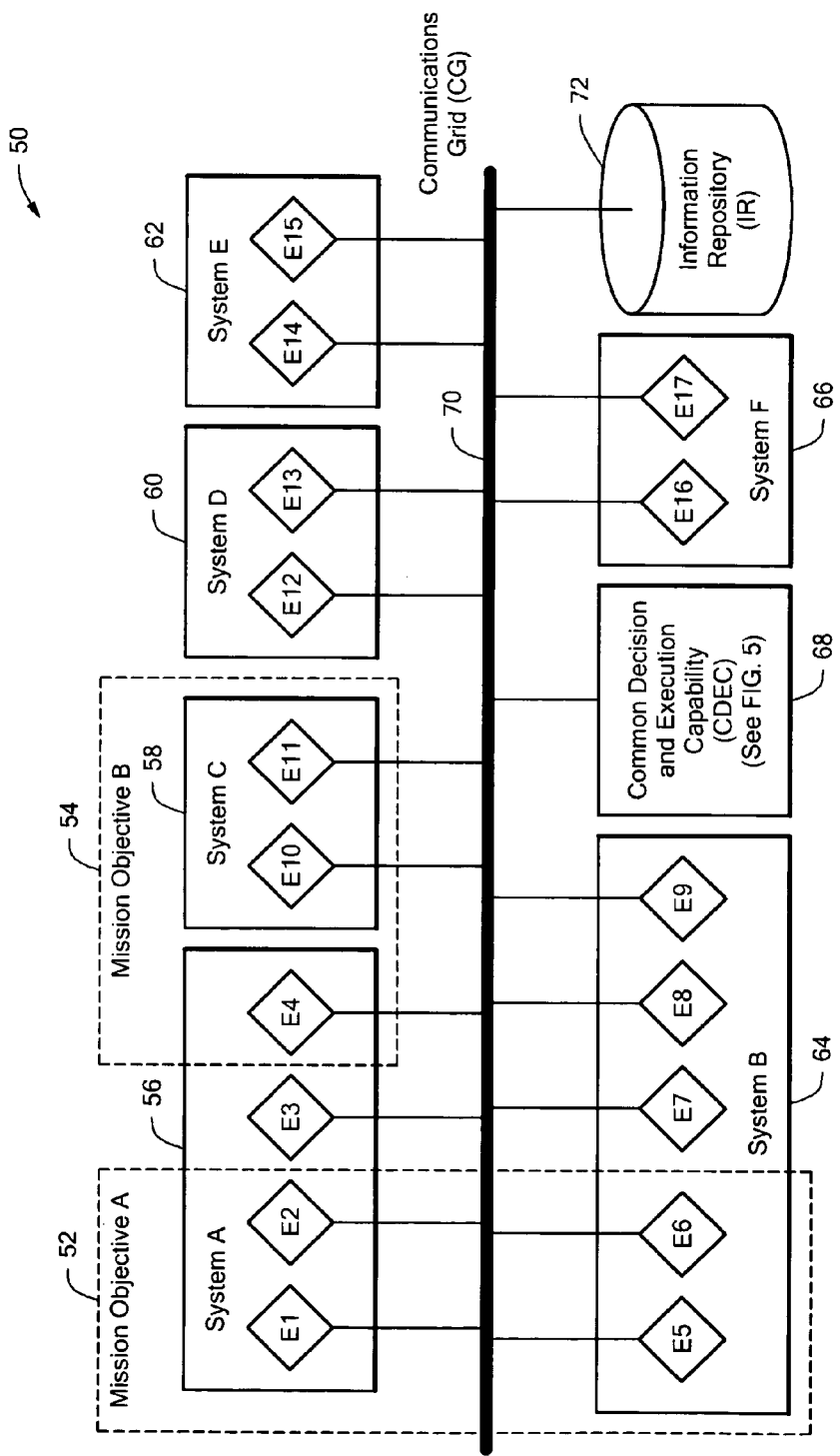
FIG. 2 is a block diagram of an arrangement having full interconnectivity and a common decision execution capability (CDEC) in accordance with the present invention.

Referring to FIG. 2, an exemplary architecture 50 includes systems 52-66, each having elements identified as E1-E17. Each element is adapted to communicate on a communications grid (CG) 70. The CG 70 is a network and is more fully described in conjunction with FIG. 3. A common decision and execution capability (CDEC) is also adapted to communicate on the CG 70. An information repository (IR) 72 is also adapted to communicate on the CG 70.

The IR 72 can provide a variety of types of information to the CDEC 68. For example, the IR 72 can provide information including, but not limited to, weather data, battle damage assessment data, enemy troop and enemy equipment locations, and friendly troop and friendly equipment locations. The IR 72 can also provide war-fighting and logistics persistent situation awareness, war-fighting and logistics objectives, and war-fighting and logistics rules and constraints. These subjects are discussed more fully in conjunction with FIG. 5.

As will become apparent from discussion below in conjunction with FIG. 5, the architecture 50 can comprise a war-fighting architecture or a logistics architecture used either for planning or execution. When used in a war-fighting arrangement, the systems 56-66 are war-fighting systems and the elements E1-E17 can include, but are limited to, a war-fighting communications element, a war-fighting sensor element, a war-fighting effector element, a war-fighting platform element, and a war-fighting command and control element. When used in a logistics arrangement, the systems 56-66 are logistics systems and the elements E1-E17 can include, but are not limited to, a logistics communications element, a logistics sensor element, a logistics effector element, a logistics platform element, and a logistics command and control element.

As will also become apparent from discussion below in conjunction with FIG. 5, in operation, the CDEC 68 can generate a war-fighting or a logistics execution using the elements E1-E17, e.g., an attack of a target, or it can generate a war-fighting or a logistics plan using the elements E1-E17, e.g., a simulation of an attack of a target.

In operation, the CDEC 68 receives information from the CG 70, allowing it to make command and control decisions. For example, the CDEC 68 can receive information from the IR 72 about a location of an enemy target and a war-fighting objective directing destruction of the enemy target. The CDEC 68 can direct actions (execute) in order to achieve the war-fighting objective. To this end, the CDEC 68 can communicate with any of the elements E1-E17 by way of the CG 70 and can take control of any of the elements E1-E17. In effect, the CDEC 68 can take control over one or more of the elements E1-E17 in lieu of control of the elements E1-E17 by the system 56-66 with which the elements E1-E17 are associated.

As an example, a first group of elements 52 is associated with a first mission objective and a second group of elements 54 is associated with a second mission objective as provided to the CDEC 68, for example, by the IR 72. For example, the first group of elements 52 can be associated with a mission objective to destroy a first target and the second group of elements 54 can be can be associated with a mission objective to destroy a second enemy target. In this example, the first group of elements 52 can include elements on the first system 56, which, for example, can be a first aircraft, and elements on a second system 64, which, for example, can be a second aircraft. The elements E1 and E5 can, for example, be aircraft platform elements corresponding to the two aircraft, and the elements E2 and E6 can be, for example, missile effector elements. Therefore, via the platform elements, E1, E5 the CDEC 68 can direct the two aircraft toward a target without pilot intervention, and the CDEC 68 can fire missiles, E2, E6 (effector elements), also without pilot intervention at the first target. In the first system 56, two elements E3 and E4 are not used to accomplish the first objective. However, to accomplish the second objective to destroy the second enemy target, the element E4 in the first system 56 is used along with other elements in another system 58. For example, the element E4 in the first system 56 can be a radar sensor element to identify the second enemy target. The system 58 can be a tank having a tank platform element E10 and a gun effector element, E11. Therefore to accomplish the second objective, the CDEC 68 could move the tank platform element E10 based upon information from the radar sensor element E4 and fire the gun effector element E11 accordingly.

It is described above that the CDEC 68 can communicate with each of the elements E1-E17. However, it should also be recognized that the elements E1-E17 can also communicate with each other. Any portion of the architecture 50 coupled to the CG 70 can communicate with any other portion of the architecture 50 coupled to the CG 70.

In one particular embodiment the communications grid (CG) 70 is the same as or similar to the Internet (or the SIPRNET) and each of the elements E1-E17 has a network address accordingly. In one particular embodiment, the network address and the communications performed in conjunction with the elements E1-E17 on the network are the same as or similar to Internet protocol version six (IPv6). However, the architecture 50 having the CG 70 applies to any network structure and any network protocol.

While the CDEC 66 and the IR 72 are shown to be discrete, in other embodiments, the CDEC 68 and/or the IR 72 are distributed among a plurality of physical locations and/or computing platforms, including, but not limited to, computing platforms disposed within one or more of the systems 56-66. While six systems 56-66 are shown, each having a number of elements, and two groups of elements 52, 54 are shown corresponding to two mission objectives, it should be appreciated that the same methods apply to more than six or fewer than six systems, each having any number of elements. Also, there can be more than two or fewer than two mission objectives that can be performed in parallel or in series.

It should be apparent from the above discussion that the CDEC 68 can control a battlespace and a logistics chain, including systems involved in execution and/or logistics functions. In one particular arrangement, one or more of the systems 56-66 are remotely piloted systems, such a remotely operated vehicle (ROV), and the CDEC controls all elements E1-E17. However, in other embodiments, certain humans, for example pilots or drivers, have the ability to override actions taken by the CDEC 68.

Figure 3:
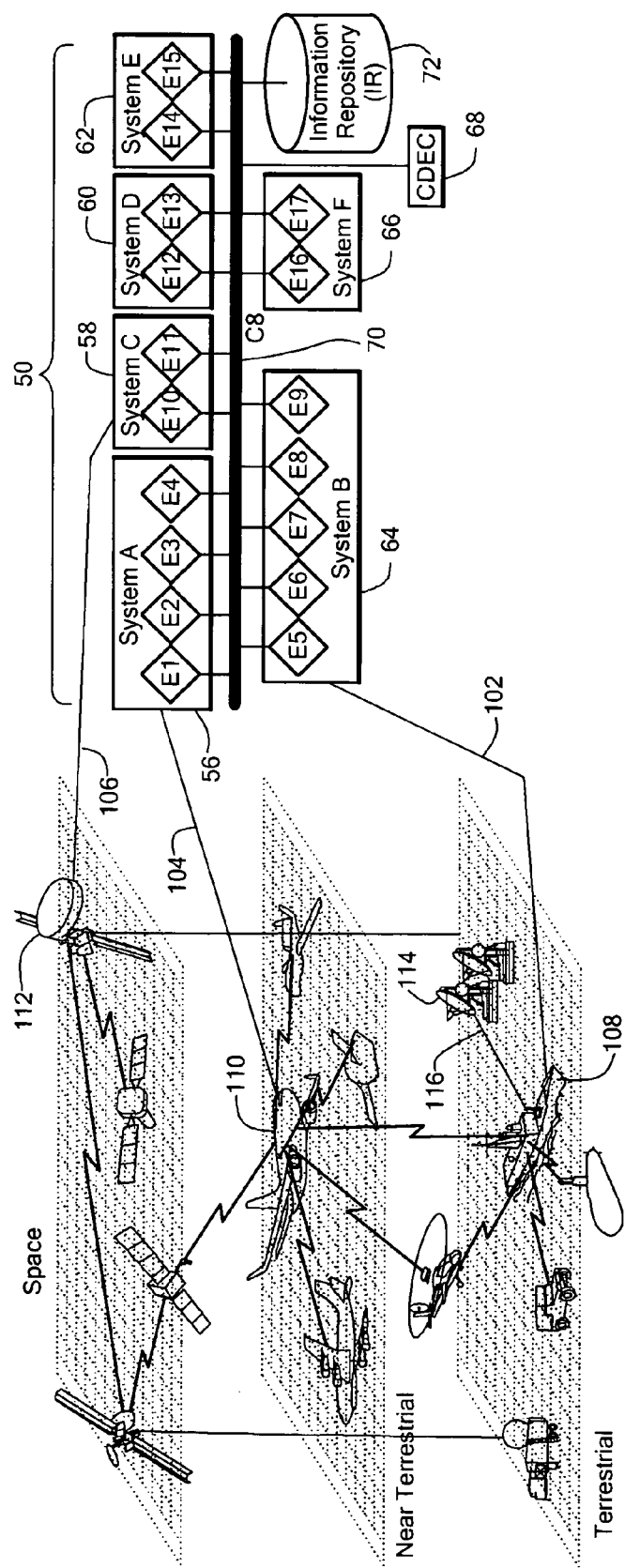
FIG. 3 is a pictorial showing the CDEC coupled to systems in three communications layers.

Referring now to FIG. 3, in which like elements of FIG. 2 are shown having like reference designations, the architecture 50 of FIG. 2 is shown in combination with three layers of systems, a terrestrial layer having terrestrial systems, e.g., trucks, tanks, robots, submarines, and ships, a near-terrestrial layer having near-terrestrial systems, e.g., unmanned air vehicles, airplanes and helicopters, and a space layer having space systems, e.g. satellites and space stations. A lead line 102 from a ship 108 to the system 64 represents that the ship can be the system 64 coupled to communicate on the CG 70. Similarly, a lead line 104 represents that an airplane 110 can be the system 56 coupled to communicate on the CG 70 and a lead line 106 represents that a satellite 112 can be the system 58 coupled to communicate on the CG 70. Others of the systems in the terrestrial layer, the near-terrestrial layer, and the space layer can be similarly associated with the architecture 50 and can similarly be coupled to communicate on the CG 70, providing full interoperable communications from each element on each system via the CG 70 to and from the CDEC 68.

Others of the lines connecting others of the systems, for example, the line 116 connecting the ship 108 to a land radar 114, are also indicative of communication couplings via the CG 70 network. In one embodiment, therefore, the CDEC 68 can communicate with each element on each system in each layer via the CG 70.

It should be appreciated that any of the terrestrial systems, the near-terrestrial systems, and the space systems can be associated with any of the military branches, for example, the Army, Navy, Air Force, and Marines, and also with commercial systems and agencies. Furthermore, any of the terrestrial systems, the near-terrestrial systems, and the space systems can be associated with national forces from any one or more countries. Therefore, the arrangement of FIG. 3 can provide full interoperability between all systems associated with any group of nations.

Figure 4:
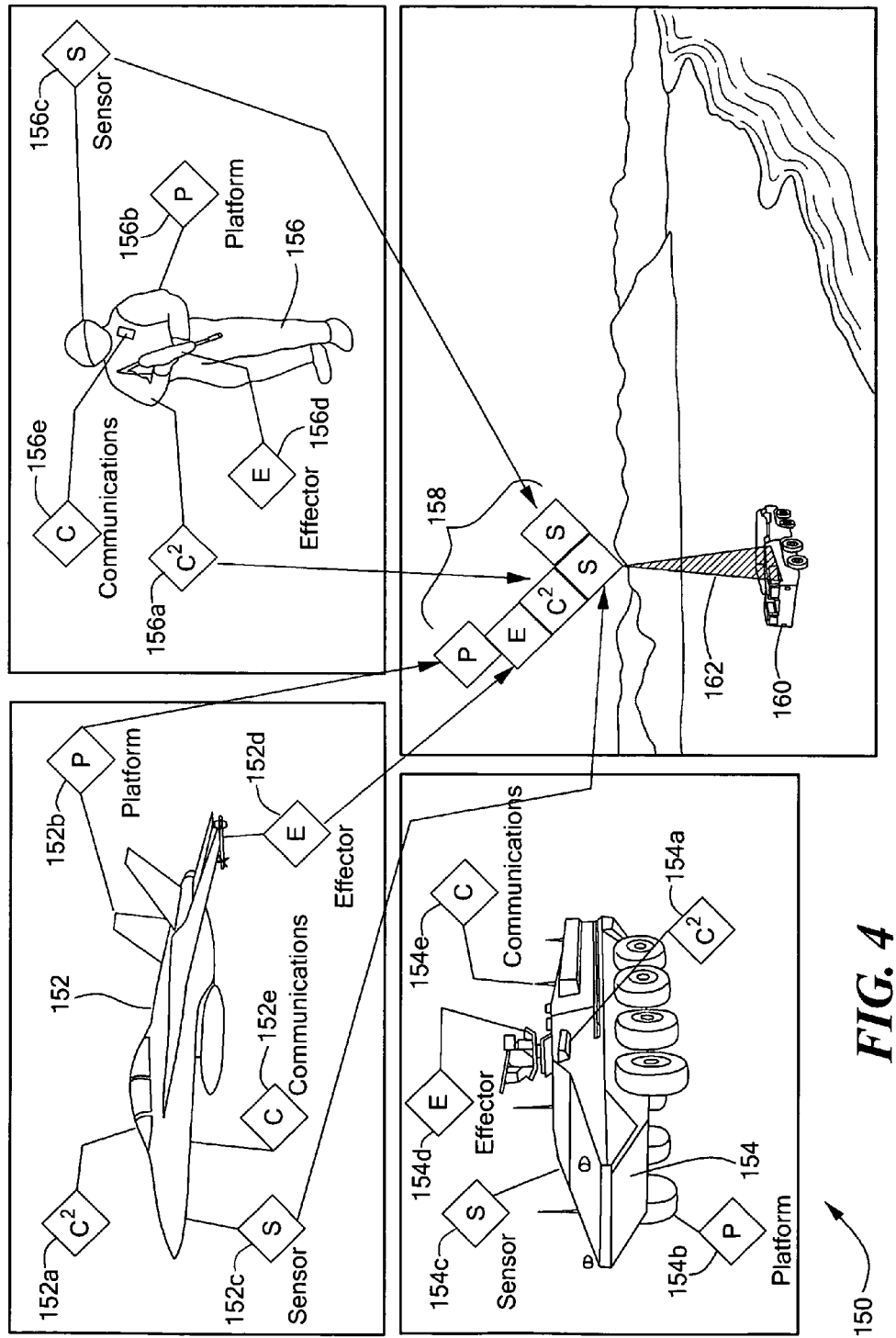
FIG. 4 is a pictorial showing systems, elements, and a war-fighting execution chain.

Referring now to FIG. 4, an architecture 150 includes a first system 152, which is an aircraft, having a command and control ($C^2$) element 152a, for example, a pilot; a platform element 152b, for example, an airframe; a sensor element 152c, for example, a radar; an effector element 152d, for example, a missile; and a communications element 152e, for example, a radio. Each of the elements 152a-152e is adapted to communicate on a network, for example on the CG 70 of FIG. 2. The architecture 150 includes a second system 154, which is a tank, having a command and control ($C^2$) element 154a, for example, a driver; a platform element 154b, for example, the tank vehicle; a sensor element 154c, for example, a video camera or a global positioning system; an effector element 154d, for example, a tank-mounted gun or a laser; and a communications element 154e, for example, a radio. The architecture 150 further includes a third system 156, which is an infantry personnel, having a command and control ($C^2$) element 156a, for example, the infantry personnel; a platform element 156b, for example, the infantry personnel; a sensor element 156c, for example, a helmet-mounted video camera; an effector element 156d, for example, a hand-held gun; and a communications element 156e, for example, a radio.

Each of the elements 152a-152e, 154a-154e, and 156a-156e is adapted to communicate on a network, for example on the CG 70 of FIG. 2 to a CDEC (not shown) and an IR (not shown). The CDEC and the IR can be the same as or similar to the CDEC 68 and the IR 72, respectively, of FIG. 2.

The CDEC can coordinate one or more of the elements, here shown the elements 152b, 152d, 152c, 156a, 156c into a "war-fighting execution chain" 158 having the elements 152b, 152d, 156e, 152c, 156c to attack an enemy target 160. For example, the sensor element 152 associated with the aircraft 152 and the sensor element 156c associated with the infantry personnel 156 can target the enemy target 160, allowing the CDEC to move the aircraft platform 152d to a location where it can effectively fire missile effectors 152d to destroy the target. Thus, the CDEC uses two systems to accomplish the war-fighting objective, which is to destroy the target 160.

It should be appreciated that, after firing the missiles, other sensors, for example the sensor element 156c can assess battle damage, provide in-flight target updates, and provide the assessment to an information repository (IR) (not shown), for example, the IR 72 of FIG. 2. The battle damage assessment is associated with an overall persistent situational awareness that can be provided to the CDEC. The CDEC can perform a second war-fighting execution chain to attack the target if the battle damage assessment warrants another attack.

The second war-fighting execution chain need not be the same as the original war-fighting execution chain 158. For example, the aircraft 152 may have been allocated to attack another target (not shown) and may not be available to re-attack the enemy target 160 at a desired time, in which case, the CDEC can allocate other systems and associated elements, for example, the tank 154 and the tank mounted gun effector element 154d, to re-attack the enemy target 160.

Figure 5:
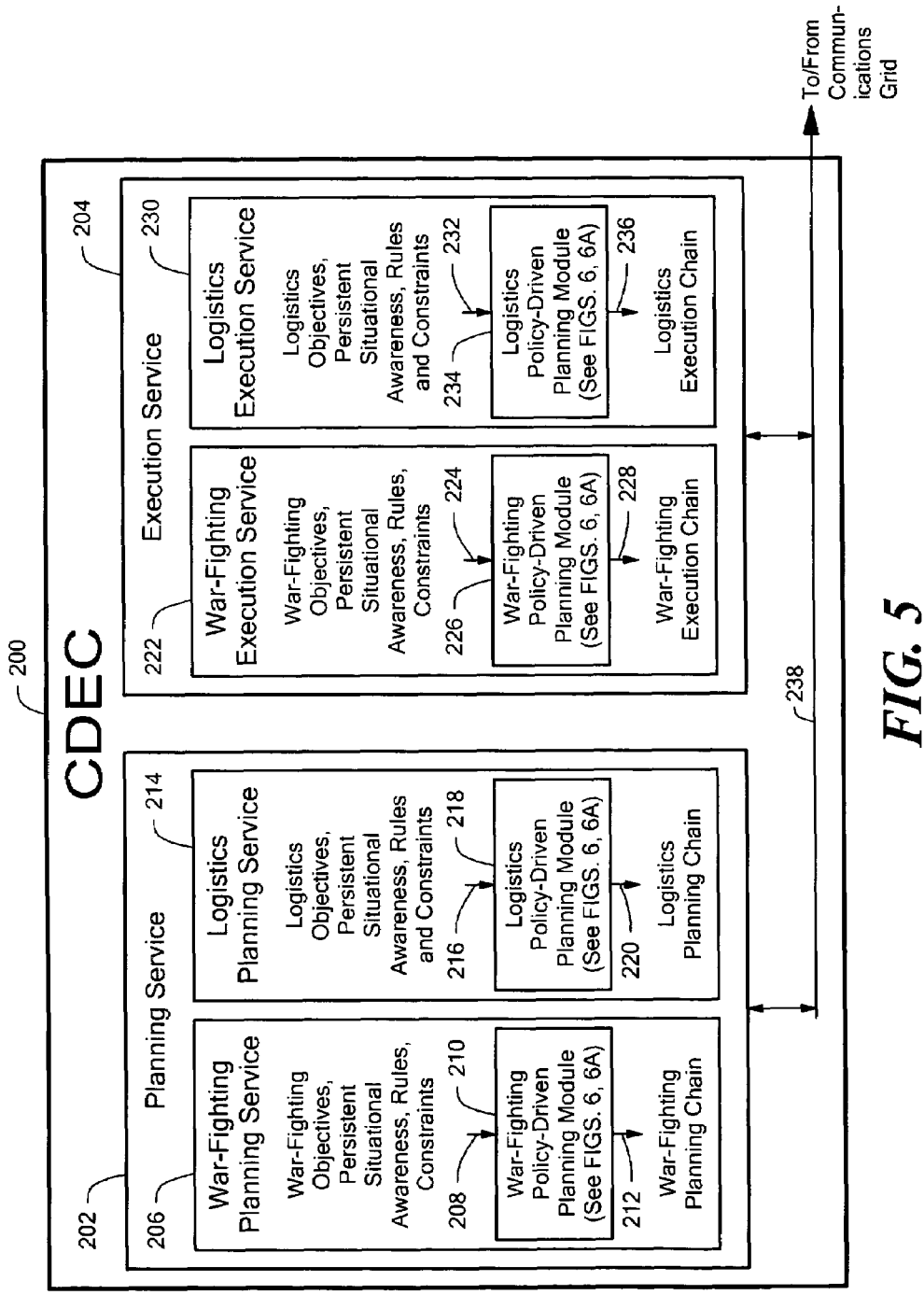
FIG. 5 is a block diagram showing details of the CDEC shown in FIG. 2.

Referring now to FIG. 5, a CDEC 200 includes one or both of execution service 204 and a planning service 202. The CDEC 200 can be the same as or similar to the CDEC 68 of FIG. 2. The execution service 204 can include one or both of a war-fighting execution service 222 and logistics execution service 230. The planning service 202 can include one or both of a war-fighting planning service 206 and logistics planning service 214. Each of the war-fighting planning service 206, the logistics planning service 214, the war-fighting execution service 222, and the logistics execution service 230 are adapted to communicate on a network 238, for example the CG 70 of FIG. 2.

The war-fighting planning service 206 includes a war-fighting policy-driven planning module 210 adapted to receive one or more of war-fighting objectives, war-fighting persistent situational awareness, war-fighting rules, and war-fighting constraints (collectively denoted 208).

The logistics planning service 214 includes a logistics policy-driven planning module 218 adapted to receive one or more of logistics objectives, logistics persistent situational awareness, logistics rules, and logistics constraints (collectively denoted 216).

The war-fighting execution service 222 includes a war-fighting policy-driven execution module 226 adapted to receive one or more of the war-fighting objectives, the war-fighting persistent situational awareness, the war-fighting rules, and the war-fighting constraints (collectively denoted 224).

The logistics execution service 230 includes a logistics policy-driven execution module 234 adapted to receive one or more of the logistics objectives, the logistics persistent situational awareness, the logistics rules, and the logistics constraints (collectively denoted 232).

Some of all of the war-fighting objectives, war-fighting persistent situational awareness, war-fighting rules, war-fighting constraints, logistics objectives, logistics persistent situational awareness, logistics rules, and logistics constraints can be communicated to the CDEC 200 via the network 238. However, some of the war-fighting objectives, war-fighting persistent situational awareness, war-fighting rules, war-fighting constraints, logistics objectives, logistics persistent situational awareness, logistics rules, and logistics constraints can be provided by the war-fighting planning service 206, the logistics planning service 214, the war-fighting execution service 222, and/or the logistics execution service 230.

Examples of the war-fighting objectives include, but are not limited to, enemy target prosecutions, and enemy target surveillance. Examples of the war-fighting persistent situational awareness include, but are not limited to, maps, terrain data, geopolitical issues, enemy asset locations, enemy asset types and quantities, own asset locations, own asset types and locations, element availabilities (i.e., previous reservations), and weather. Examples of war-fighting rules include, but are not limited to, types of effector weapons to use in particular battlespaces, and types of systems to use in particular battlespaces. For example, it may be a war-fighting rule that certain types of unguided bombs cannot be used in populated areas, and aircraft intended to attack tanks also cannot be used in populated areas (e.g., due to risk of collateral effects). Examples of war-fighting constraints include, but are not limited to, quantities of systems and effector elements associated with the systems that are present in the battlefield.

Examples of the logistics objectives include, but are not limited to, element (e.g., missile) movement and element acquisition. Examples of the logistics persistent situational awareness include, but are not limited to, location of systems and elements in storage and in transit. Examples of logistics rules include, but are not limited to, types of effector weapons to use in particular battlespaces, and types of systems to use in particular battlespaces. For example, it may be a logistics rule that certain types of unguided bombs cannot be used in populated areas, and aircraft intended to attack tanks also cannot be used in populated areas. Examples of logistics constraints include, but are not limited to, production throughput capability of contractors who are engaged in manufacture of an element.

The war-fighting policy-driven planning module 210 can produce a "war-fighting planning chain" 212. The logistics policy-driven planning module 218 can produce a "logistics planning chain" 220. The war-fighting policy-driven execution module 226 can produce a "war-fighting execution chain" 228. The logistics policy-driven execution module 234 can produce a "logistics execution chain" 236. The war-fighting planning chain 212, the logistics planning chain 220, the war-fighting execution chain 228, and the logistics execution chain 236 are referred to as "virtual chains" herein.

It should be appreciated that each of the virtual chains 212, 220, 228, 236 can have a similar structure. This will become more apparent in conjunction with FIGS. 6 and 6A.

Figure 6:
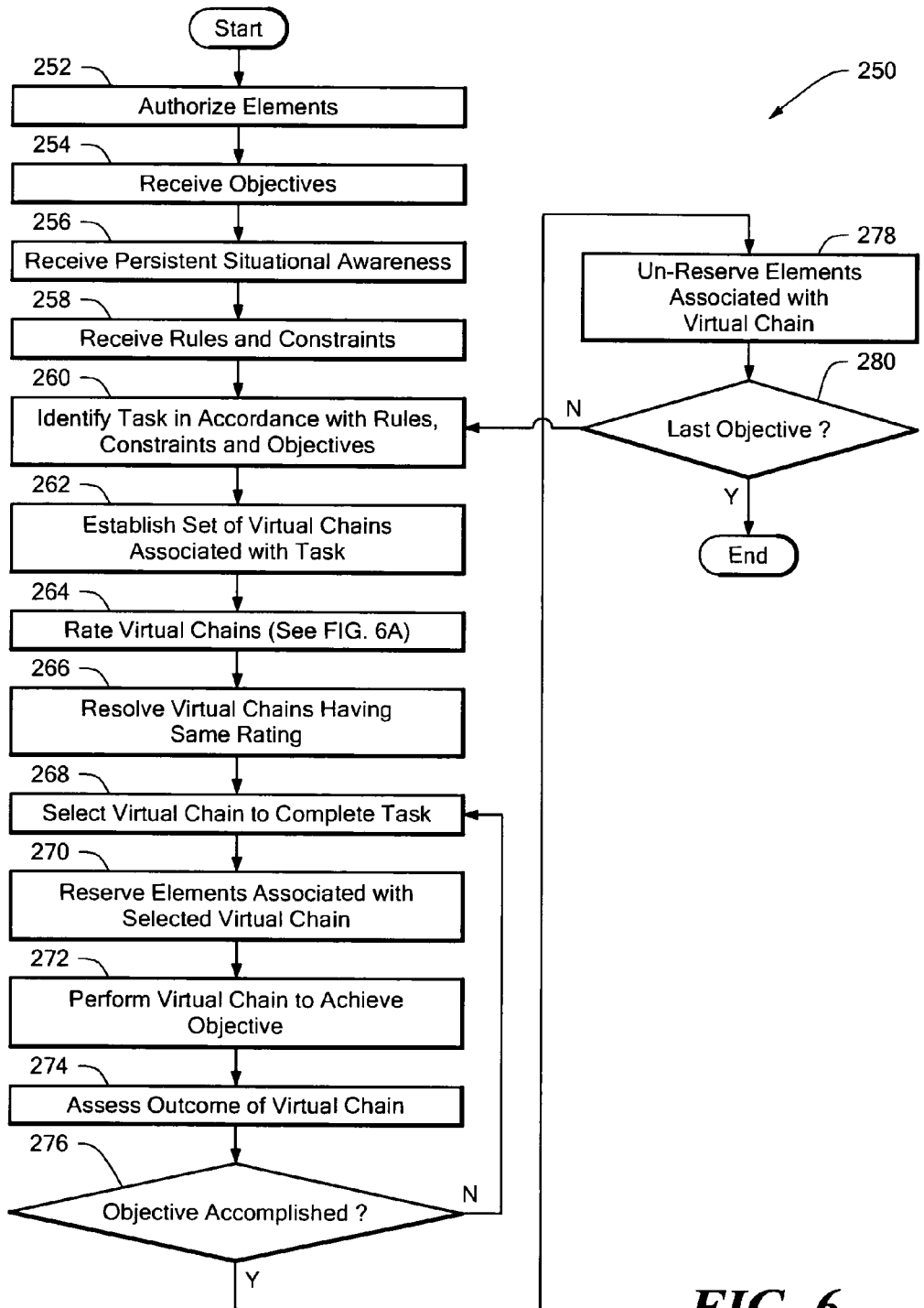
FIG. 6 is a flow chart showing a method associated with the CDEC of FIGS. 2 and 5.
Figure 6A:
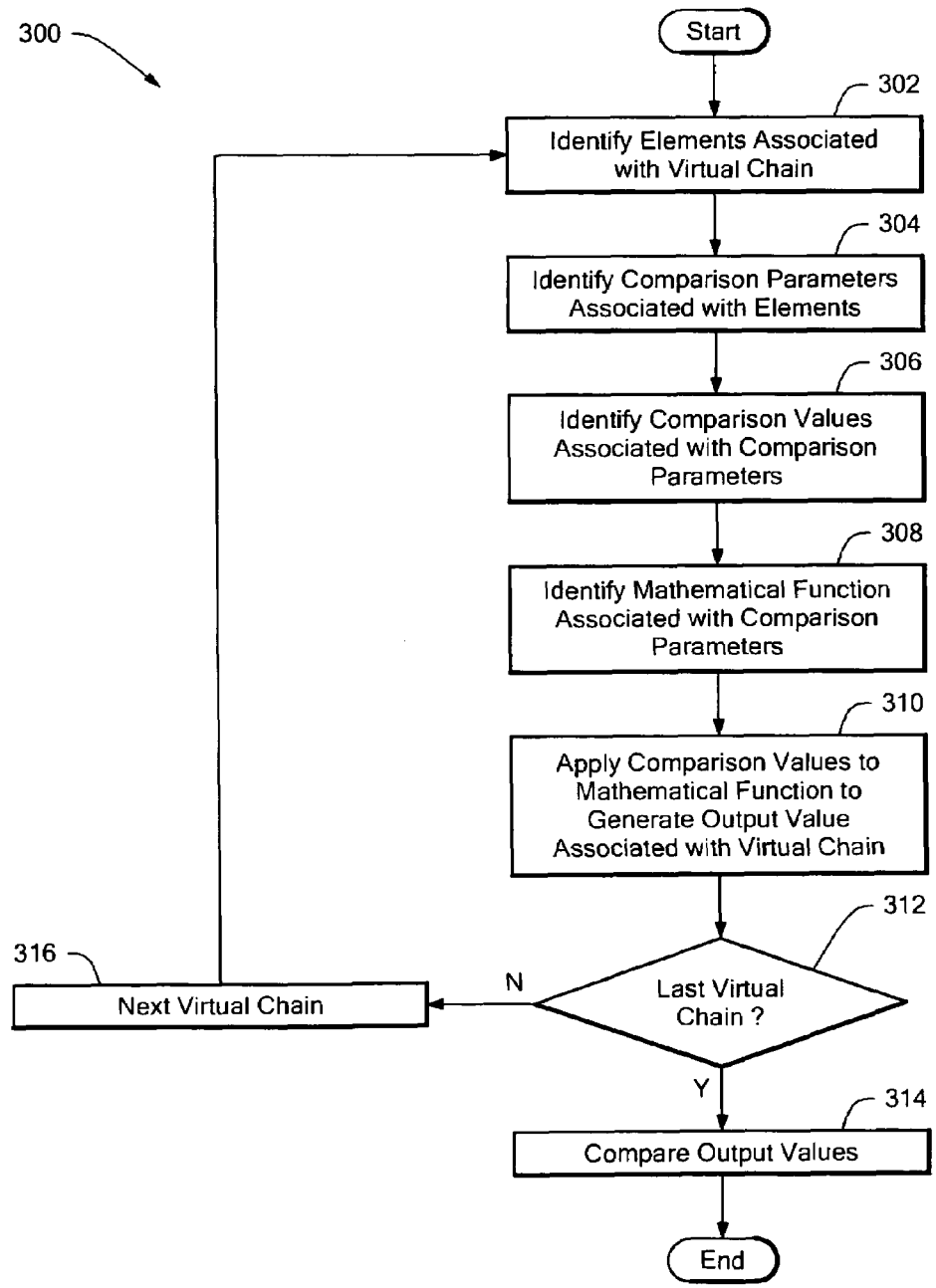
FIG. 6A is a flow chart showing further details of the method of FIG. 6.

It should be appreciated that FIGS. 6 and 6A show flowcharts corresponding to the below contemplated technique which would be implemented in the CDEC 200 computer system (FIG. 5). The rectangular elements (typified by element 252 in FIG. 6), herein denoted "processing blocks," represent computer software instructions or groups of instructions. The diamond shaped elements (typified by element 276 in FIG. 6), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, functions associated with the locks can be performed in any convenient or desirable order.

Referring now to FIG. 6, a process 250 begins at step 252, where one or more elements are authorized. The process 250 can be associated with any of the modules 210, 218, 226, 234 in the CDEC 200 of FIG. 5. The authorizing 252 can identify elements that are not yet reserved by other virtual chains, so that they can be used without interference from the other virtual chains.

At block 254, objectives are received, for example, war-fighting or logistics objectives. At block 258 war-fighting or logistics rules and constraints are received. At block 260, one or more tasks associated with the rules, constraints, and objectives are identified. For example, a war-fighting execution task can be identified specifying an attack upon an enemy target based upon a war-fighting objective to destroy the enemy target. For another example, a logistics execution task can be associated with movement of elements from one place to another to replace elements used in a battlespace. For still further examples, war-fighting and logistics planning tasks can be associated with a plan for the attack upon the enemy target and a plan for the movement of elements, respectively.

At block 262, one or more virtual chains are established in accordance with the task, wherein each of the established virtual chains is able to perform the task. In accordance with FIG. 5, the virtual chain can be any one of the war-fighting planning chain 212, the logistics planning chain 220, the war-fighting execution chain 228, and the logistics execution chain 236, depending upon the objectives identified at block 254. Therefore, it will be understood that the one or more virtual chains established at block 262 can either be planning chains, resulting in a plan, or execution chains, resulting in an execution.

At block 264, the established virtual chains can be rated. The rating is described more fully in conjunction with FIG. 6A below. However, let it suffice here to say that the rating can select a best virtual chain (or more than one best virtual chain) from among the one or more virtual chains established at block 262.

At block 266, virtual chains rated at block 264 having the same rating can be resolved to provide a selected virtual chain at block 268. In one particular embodiment, virtual chains having the same rating are resolved by selecting a virtual chain having the oldest effector element from among the virtual chains having the same rating. At block 270, elements associated with the virtual chain selected at block 268 are reserved. Upon being reserved, the elements are dedicated to the task identified at block 260, and cannot be used to perform another task until they are released.

At block 272, using the reserved elements associated with the selected virtual chain selected at block 268, the selected virtual chain is performed. If the virtual chain is a war-fighting execution chain or a logistics execution chain, the performance of the virtual chain results in a war-fighting execution or in a logistics execution, respectively. If the virtual chain is a war-fighting planning chain or a logistics planning chain, the performance of the virtual chain results in a war-fighting plan or in a logistics plan, respectively.

At block 274, an outcome of the selected virtual chain is assessed. For example, if the selected virtual chain is a war-fighting execution chain, the outcome can be assessed by a battle damage assessment, which is a portion of the war-fighting persistent situational awareness described above. For another example, if the selected virtual chain is a logistics execution chain, the outcome can be assessed by a logistics tracking report, which is a portion of the logistics persistent situational awareness described above. For yet another example, if the virtual chain performed is a war-fighting planning chain, the outcome can be assessed by a simulated battle damage assessment. For yet another example, if the virtual chain performed is a logistics planning chain, the outcome can be assessed by a simulated logistics tracking report.

At decision block 276, if the objective received at block 254 is accomplished, e.g., if an enemy target is destroyed, the process 250 proceeds to block 278, where the elements reserved at block 270 are un-reserved, allowing their use in other virtual chains. At block 280 if the objective accomplished was the last objective, the process ends. If however, the objective accomplished is not the last objective, the process returns to block 260 where another objective is identified, and the process proceeds with the new objective.

At block 276, if the first objective was not accomplished, the process returns to block 268, where another virtual chain is selected to accomplish the task. The process then proceeds with the new virtual chain.

Figure 1:
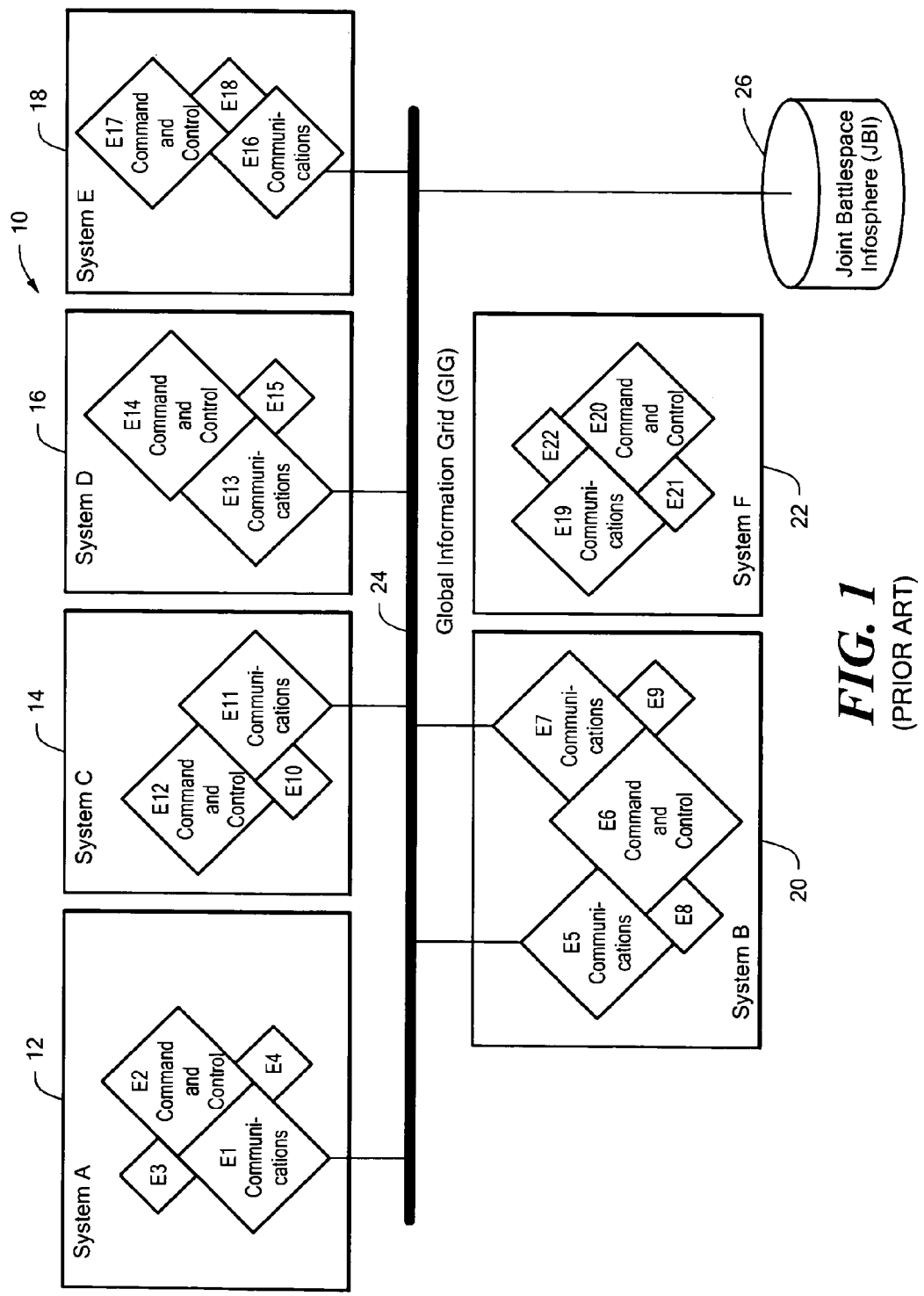
FIG. 1 is a block diagram of a prior art military arrangement.

In one particular embodiment, the process 250 is performed only when a conventional group of systems according to FIG. 1 cannot be identified to perform a task identified in block 260.

Referring now to FIG. 6A a process 300 can be used to rate virtual chains, for example, in conjunction with block 264 of FIG. 6. The process 300 begins at block 302, where elements associated with a virtual chain established at block 262 of FIG. 6 are identified. At block 304, comparison parameters associated with the elements are identified. The comparison parameters can be different depending upon the element and upon whether the virtual chain is a war-fighting chain or a logistics chain. For a war-fighting chain, the comparison parameters can include, but are not limited to, a dollar cost to replace an element, a maintenance interval associated with an element, a kill radius associated with an effector element, an availability of an element at a location of interest, a length of time necessary to re-arm a system with an effector element, a reception range associated with a communications element, a speed of a platform element, and an accuracy of a sensor element. For a logistics element, the comparison parameters can include, but are not limited to, a dollar cost to replace the element, a maintenance interval associated with an element, a time to replace an element, a time to transport an element, and a cost to transport an element.

At block 306, comparison values are provided for one or more of the comparison parameters. Comparison values are provided in accordance with known element characteristics, for example, cost. At block 308, a mathematical function is identified to which the comparison values can be applied. At block 310, the comparison values provided at block 306 are applied to the mathematical function, resulting in an output value that can be used to compare the virtual chain with other virtual chains established at block 262 of FIG. 6.

If, at decision block 312, the virtual chain is not the last virtual chain established at block 262 of FIG. 2, then the next virtual chain established at block 262 of FIG. 2 is selected at block 316 and the process proceeds at block 302. If, however, at decision block 312, the virtual chain is the last virtual chain, then the process proceeds to block 314, where the output values from the mathematical function, each associated with a respective virtual chain, are compared to identify one or more best virtual chains.

In one particular embodiment, the mathematical function identified at block 308 is a "cost" function.

The cost function provides a least squares method of optimization. The cost function is calculated for each of the virtual chains. One or more virtual chains having the smallest cost function output value are identified. The cost function can have the following form:

$$C = \sqrt{\sum_{1}^{N} W \cdot \xi_i^2}$$

where C represents the cost function, $\xi_i$ is an indexed one of the comparison values associated with the comparison parameters, W is a weighting factor (the greater value of W the more important the comparison parameter), and n is an integer representing the number of comparison parameters to be considered. The cost function provides a definition of what comparison parameters are most important by their relative weightings. In addition, by including or not including various comparison parameters, different outcomes are possible.

While the cost function is described above, other mathematical functions can be identified at block 308 and applied at block 310 to relatively rate the virtual chains established at block 262 of FIG. 6.

Figure 7:
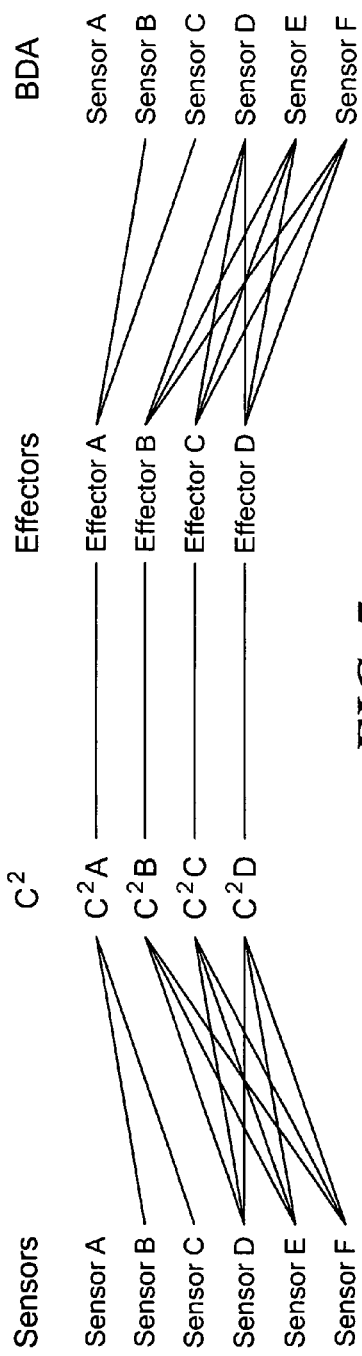
FIG. 7 is a block diagram showing exemplary prior art war-fighting element combinations.

Referring now to FIG. 7, a variety of prior art element combinations, here war-fighting element combinations, are shown having sensor elements, command and control ($C^2$) elements, effector elements, and also battle damage assessment (BDA) elements (which can be sensor elements). Each of the listed elements is indicative of a corresponding element associated with a conventional military system. For example, a first $C^2$ element, $C^2A$, can be associated with an AWACS aircraft. In the prior art, only a relatively small number of war-fighting element combinations can be established with the listed elements, represented by various paths connecting the elements. In part, the relatively small number of available war-fighting element combinations is due to the stove-piped arrangement described above in conjunction with FIG. 1, in which the $C^2$ elements, for example, $C^2A$, can control only those effector elements, for example, effector A, with which they are directly associated.

It should be recognized that the prior art element combinations are manually derived, and that all of the element combination are not often compared and contrasted before selecting one element combination for execution.

Figure 7A:
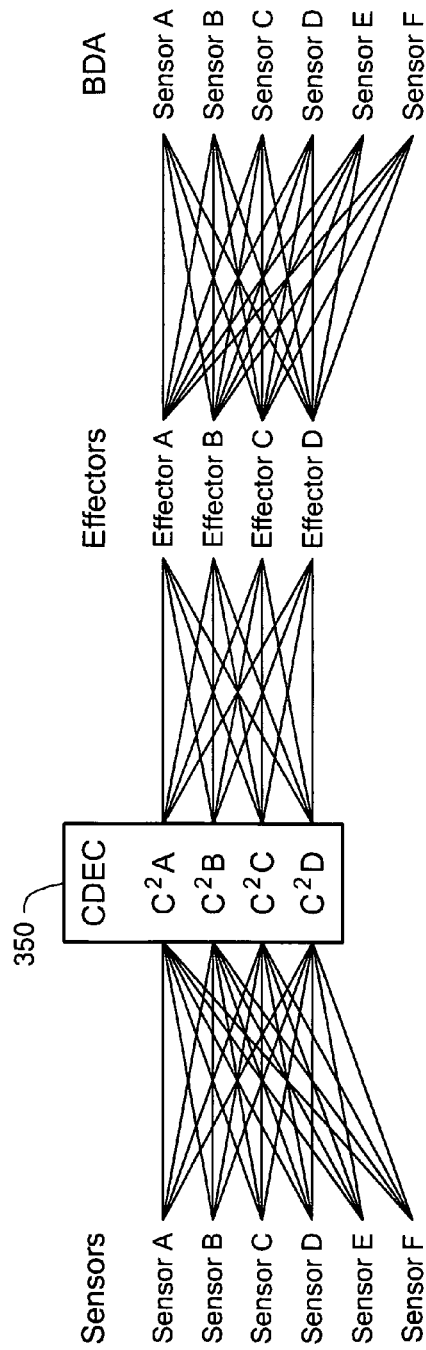
FIG. 7A is a block diagram showing a CDEC and war-fighting execution chains in accordance with the present invention.

Referring now to FIG. 7A, virtual chains in accordance with the present invention are represented by various paths connecting the elements. Here however, the $C^2$ elements are grouped as a common decision and execution capability (CDEC) 350. The CDEC 350 can be the same as or similar to the CDEC 68 of FIG. 2 or the CDEC 200 of FIG. 5. The CDEC 350 can either be a computing node replacing the individually listed $C^2$ elements, or, as described above, the CDEC 350 can be a distributed CDEC replacing the individually listed $C^2$ elements, or, the CDEC 350 can be a distributed CDEC using computing platforms associated with some or all of the individually listed $C^2$ elements. In each case, the CDEC is adapted to control each of the listed effector elements, in any combination.

The war-fighting sensor elements can include, but are not limited to, a radar system, a video system, and a global positioning system (GPS). The war-fighting effector elements can include, but are not limited to, a missile, a gun, a laser, a propaganda leaflet, and a biological agent, for example, a virus. The war-fighting platform elements can include, but are not limited to a military truck, a military tank, a military aircraft, a military ship, a military satellite, a military person, a commercial truck, a commercial aircraft, a commercial ship, a commercial satellite, and a civilian person.

It should be apparent that there is full connectivity between all of the war-fighting sensor elements and the CDEC 350, between the CDEC 350 and each of the war-fighting effector elements, and between each of the war-fighting effector elements and each of the war-fighting BDA elements. Though not explicitly shown, there is full connectivity between every element and every other element and between the CDEC 350 and each element. The CDEC 350 can control every element.

The full connectivity results in hundreds of war-fighting execution chains, represented by various paths connecting the elements. A much greater number of options are available for attacking an enemy target and assessing resulting damage than are available in the prior art arrangement of FIG. 7.

The arrangement of FIG. 7A is but one war-fighting arrangement having particular war-fighting elements. In alternate arrangements, there can be a greater number or a smaller number of each type of element, and the elements can be different elements. The elements can be within a military branch, include elements from more than one military branch, and/or include elements from more than one national military service.

Figure 8:
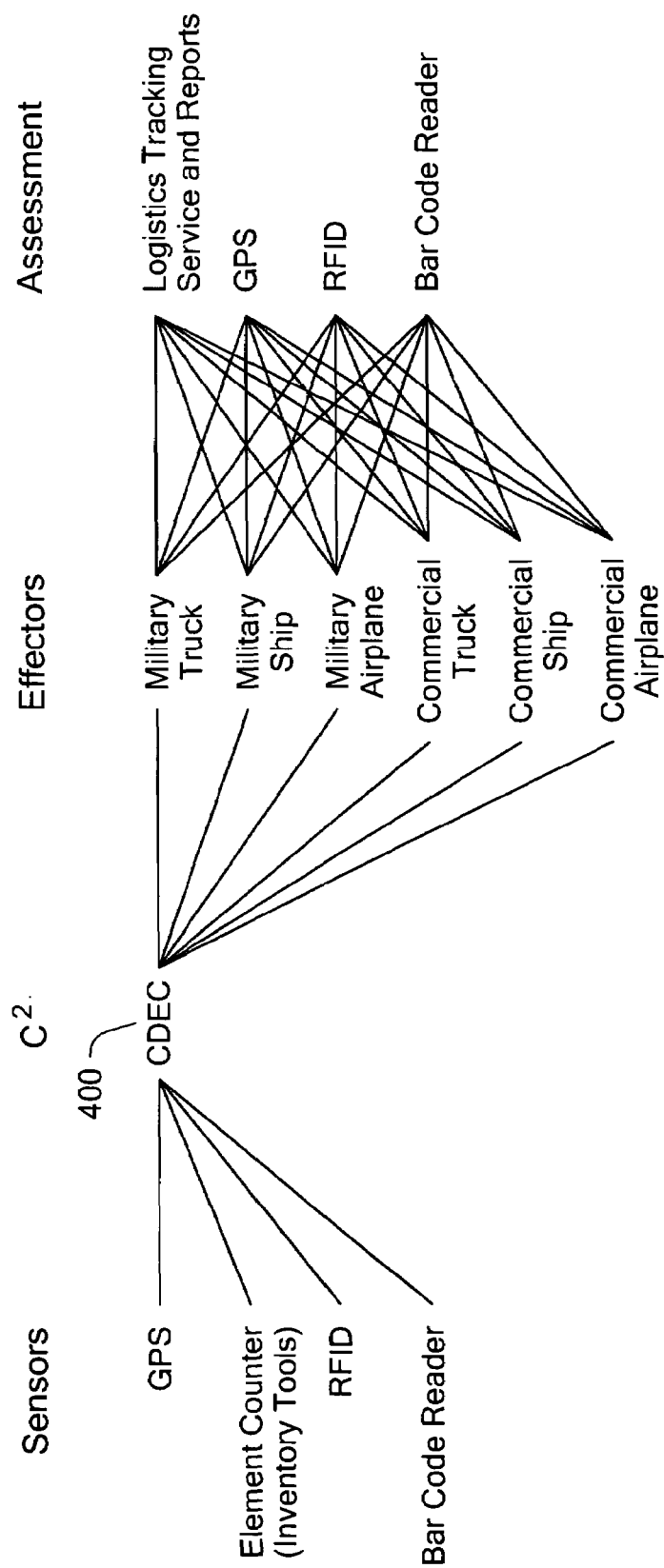
FIG. 8 is a block diagram showing logistics execution chains.

Referring now to FIG. 8, a variety of virtual chains, here logistics execution chains, are shown having sensor elements, command and control ($C^2$) elements, effector elements, and also assessment elements (which can be sensor elements). The sensor elements can include, but are not limited to, a global positioning system (GPS), an element counter associated with inventor software or tools, a radio frequency identification tag (RFID), a bar code reader, a fuel sensor, a temperature sensor, and a particle sensor. The effector elements can include, but are not limited to, a military truck, a military ship, a military airplane, a commercial tuck, a commercial ship, a commercial airplane, and a logistics contract effector element. The assessment element (which can be sensors) can include, but are not limited to, logistics tracking service and reports, a global positioning system (GPS), a radio frequency identification tag (RFID), and a bar code reader.

The $C^2$ element is a common decision and execution capability (CDEC) 400 The CDEC 400 can be the same as or similar to the CDEC 68 of FIG. 2 or the CDEC 200 of FIG. 5.

It should be apparent that there is full connectivity between all of the logistics sensor elements and the CDEC 400, between the CDEC 400 and each of the logistic effector elements, and between each of the logistics effector elements and each of the logistics assessment elements. Though not explicitly shown, there is full connectivity between every element and every other element and between the CDEC 400 and each element. The CDEC 400 can control every element.

The full connectivity results in a great number of logistics execution chains, represented by various paths connecting the elements. Therefore a great number of options are available for moving material.

The arrangement of FIG. 8 is but one arrangement logistics having particular logistics elements. In alternate arrangements, there can be more than or fewer than each type of element, and the elements can be different elements. The elements can be within a military branch, include elements from more than one military branch, and/or include elements from more than one national military service.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A system, comprising:
a communications grid;
two or more different types of military systems, each one of the two or more different types of military systems having a respective two or more different types of war-fighting elements coupled to communicate on the communications grid, each one of the two or more different types of war-fighting elements selected from among a war-fighting communications element, a war-fighting sensor element, a war-fighting effector element, a war-fighting platform element, and a war-fighting command and control element, wherein the war-fighting communications element is configured to communicate war-fighting information on the communications grid, the war-fighting sensor element is configured to communicate war-fighting sensor data on the communications grid, the war-fighting effector element is configured to communicate war-fighting information on the communications grid and to perform a war-fighting function in accordance with the war-fighting information, the war-fighting platform element is configured to communicate war-fighting information on the communications grid and to move the war-fighting platform element in accordance with the war-fighting information, and the war-fighting command and control element is configured to communicate war-fighting information on the communications grid and to perform war-fighting command and control functions local to a respective one of the two or more military systems in accordance with the war-fighting information; and
a common-decision-execution-capability module coupled to communicate on the communications grid with the two or more different types of war-fighting elements of the two or more different types of military systems.

2. The system of claim 1, wherein the common-decision-execution-capability module is distributed among a plurality of computing platforms.

3. The system of claim 1, wherein the common-decision-execution-capability module includes a war-fighting execution service having a war-fighting policy-driven execution module configured to receive one or more of a war-fighting objective, war-fighting persistent situational awareness, a war-fighting rule, or a war-fighting constraint, configured to generate a war-fighting execution chain associated with the respective two or more different types of war-fighting elements of the two or more different types of military systems, and configured to communicate on the communications grid with the respective two or more different types of war-fighting elements in response to the one or more of the war-fighting objective, the war-fighting persistent situational awareness, the war-fighting rule, or the war-fighting constraint in order to attempt to achieve the war-fighting objective.

4. The system of claim 3, wherein the war-fighting policy-driven execution module is further configured to communicate war-fighting information on the communications grid corresponding to a battle damage assessment associated with the war-fighting objective.

5. The system of claim 1, wherein the war-fighting sensor element is selected from among a radar system, a video system, and a global positioning system.

6. The system of claim 1, wherein the war-fighting effector element is selected from among a missile, a gun, a laser, a propaganda leaflet, and a biological agent.

7. The system of claim 1, wherein the war-fighting platform element is selected from among a military aircraft, a military tank, a military truck, a military ship, a military satellite, a military person, a commercial truck, a commercial aircraft, a commercial ship, a commercial satellite, and a civilian person.

8. The system of claim 1, wherein the system further includes one or more logistics systems, each having two or more different types of logistics elements coupled to communicate on the communications grid, each one of the two or more different types of logistics element selected from among a logistics communications element, a logistics sensor element, a logistics effector element, a logistics platform element, and a logistics command and control element, wherein the logistics sensor element is configured to communicate non-combat logistics data on the communications grid, the logistics effector element is configured to communicate non-combat logistics information on the communications grid, configured to receive material associated with the one or more logistics systems, and configured to move the material in non-combat transport in accordance with the received logistics information, the logistics platform element is configured to communicate non-combat logistics information on the communications grid, configured to receive material associated with the one or more logistics systems, and configured to move the material in non-combat transport in accordance with the received logistics information, and the logistics command and control element is configured to communicate non-combat logistics information on the communications grid and to perform non-combat logistics command and control functions local to a respective one of the one or more logistics systems in accordance with the logistics information.

9. The system of claim 8, wherein the logistics sensor element is selected from among a global positioning sensor element, an element counter sensor element, a RF identification tag sensor element, a bar code reader sensor element, a fuel sensor, a temperature sensor, and a particle sensor.

10. The system of claim 8, wherein the logistics effector element is selected from among a military truck effector element, a military ship effector element, a military airplane effector element, a commercial truck effector element, a commercial ship effector element, a commercial airplane effector element and a logistics contract effector element.

11. The system of claim 1, wherein the common-decision-execution-capability module includes a logistics execution service having a logistics policy-driven execution module configured to receive one or more of a non-combat logistics objective, non-combat logistics persistent situational awareness, a non-combat logistics rule, or a non-combat logistics constraint, configured to generate a non-combat logistics execution chain associated with the respective two or more different types of logistics elements of the one or more logistics systems, and configured to communicate on the communications grid with the respective two or more different types of logistics elements in response to the one or more of the non-combat logistics objective, the non-combat logistics persistent situational awareness, the non-combat logistics rule, or the non-combat logistics constraint.

12. The system of claim 11, wherein the logistics policy-driven execution module is further configured to receive information on the communications grid corresponding to a non-combat logistics assessment associated with the non-combat logistics objective.

13. The system of claim 1, wherein the common-decision-execution-capability module includes a planning service, the planning service comprising one or more of:
   a war-fighting planning service comprising a war-fighting policy-driven planning module configured to receive one or more of a war-fighting objective, war-fighting persistent situational awareness, a war-fighting rule, or a war-fighting constraint, and configured to generate a war-fighting plan having a war-fighting planning chain having the two or more respective different types of war-fighting elements of the two or more different types of military systems in response to the one or more of the war-fighting objective, the war-fighting persistent situational awareness, the war-fighting rule, or the war-fighting constraint; or
   a logistics planning service comprising a logistics policy-driven planning module configured to receive one or more of a non-combat logistics objective, non-combat logistics persistent situational awareness, a non-combat logistics rule, or a non-combat logistics constraint, and to generate a logistics plan having a non-combat logistics planning chain associated with two or more different types of logistics elements of one or more logistics systems in response to the one of more of the non-combat logistics objective, the non-combat logistics persistent situational awareness, the non-combat logistics rule, or the non-combat logistics constraint.

14. The system of claim 13, wherein the common-decision-execution-capability module is further coupled to at least one of a contracting office, a material control office, and an element supplier, wherein the at least one of the contracting office, the material control office, and the element supplier are responsive to the logistics plan.

15. The system of claim 1, further comprising an information repository configured to retain data including at least one of war-fighting situational awareness data, logistics situational awareness data, war-fighting data, logistics data, war fighting rule data, war fighting constraints data, logistics rule date, or logistics constraints data.

16. A system, comprising:
a communications grid;
at least one of:
   two or more different types of military systems, each one of the two or more different types of military systems having a respective two or more different types of war-fighting elements coupled to communicate on the communications grid, each one of the two or more war-fighting elements selected from among a war-fighting communications element, a war-fighting sensor element, a war-fighting effector element, a war-fighting platform element, and a war-fighting command and control element, wherein the war-fighting communications element is configured to communicate war-fighting information on the communications grid, the war-fighting sensor element is configured to communicate war-fighting sensor data on the communications grid, the war-fighting effector element is configured to communicate war-fighting information on the communications grid and to perform a war-fighting function in accordance with the war-fighting information, the war-fighting platform element is configured to communicate war-fighting information on the communications grid and to move the war-fighting platform element in accordance with the war-fighting information, and the war-fighting command and control element is configured to communicate war-fighting information on the communications grid and to perform war-fighting command and control functions local to a respective one of the two or more military systems in accordance with the war-fighting information; or
   one or more logistics systems, each having two or more different types of logistics elements coupled to communicate on the communications grid, each one of the two or more different types of logistics elements selected from among a logistics communications element, a logistics sensor element, a logistics effector element, a logistics platform element, and a logistics command and control element, wherein the logistics sensor element is configured to communicate non-combat logistics data on the communications grid and the logistics effector element is configured to communicate non-combat logistics information on the communications grid, configured to receive material associated with ones of the one or more logistics systems, and configured to move the material in non-combat transport in accordance with the received logistics information, the logistics platform element is configured to communicate non-combat logistics information on the communications grid, configured to receive material associated with the one or more logistics systems, and configured to move the material in non-combat transport in accordance with the received logistics information, and the logistics command and control element is configured to communicate non-combat logistics information on the communications grid and to perform non-combat logistics command and control functions local to a respective one of the one or more logistics systems in accordance with the logistics information; and
a common-decision-execution-capability module coupled to communicate on the communications grid with at least one of the two or more different types of war-fighting elements of the two or more different types of military systems or with the two or more different types of logistics elements of the one or more logistics systems.

17. The system of claim 16, wherein the common-decision-execution-capability module includes a war-fighting execution service having a war-fighting policy-driven execution module configured to receive one or more of a war-fighting objective, war-fighting persistent situational awareness, a war-fighting rule, or a war-fighting constraint, configured to generate a war-fighting execution chain associated with the respective two or more different types of war-fighting elements, and configured to communicate on the communications grid with the respective two or more respective different types of war-fighting elements of the two or more different types of military systems in response to the one or more of the war-fighting objective, the war-fighting persistent situational awareness, the war-fighting rule, or the war-fighting constraint in order to attempt to achieve the war-fighting objective.

18. The system of claim 16, wherein the common-decision-execution-capability module includes a logistics execution service having a logistics policy-driven execution module configured to receive one or more of a non-combat logistics objective, non-combat logistics persistent situational awareness, a non-combat logistics rule, or a non-combat logistics constraint, configured to generate a non-combat logistics execution chain associated with the two or more logistics elements of the one or more logistics systems, and configured to communicate on the communications grid with the two or more different types of logistics elements in response to the one or more of the non-combat logistics objective, the non-combat logistics persistent situational awareness, the non-combat logistics rule, or the non-combat logistics constraint.

19. The system of claim 16, wherein the common-decision-execution-capability module includes a planning service, the planning service comprising one or more of:
a war-fighting planning service comprising a war-fighting policy-driven planning module configured to receive one or more of a war-fighting objective, war-fighting persistent situational awareness, a war-fighting rule, or a war-fighting constraint, and configured to generate a war-fighting plan having a war-fighting planning chain having the two or more respective different types of war-fighting elements of the two or more different types of military systems in response to the one or more of the war-fighting objective, war-fighting persistent situational awareness, the war-fighting rule, or the war-fighting constraint; or
a logistics planning service comprising a logistics policy-driven planning module configured to receive one or more of a non-combat logistics objective, non-combat logistics persistent situational awareness, a non-combat logistics rule, or a non-combat logistics constraint, and to generate a non-combat logistics plan having a non-combat logistics planning chain associated with the two or more different types of logistics elements of the one or more logistics systems in response to the one of more of the non-combat logistics objective, the non-combat logistics persistent situational awareness, the non-combat logistics rule, or the non-combat logistics constraint.

20. The system of claim 16, further comprising an information repository configured to retain data including at least one of war-fighting situational awareness data, logistics situational awareness data, war-fighting data, logistics data, war fighting rule data, war fighting constraints data, logistics rule data, or logistics constraints data.

21. A method implemented in a computer system, comprising:
receiving at least one of a rule, a constraint, an objective, and persistent situational awareness;
identifying a task in accordance with the at least one of the rule, the constraint, the objective, and the persistent situational awareness;
establishing a set of virtual chains associated with the identified task, each virtual chain comprising two or more elements associated with a single system;
rating two or more of the virtual chains in the set of virtual chains;
resolving virtual chains from among the two or more virtual chains having the same rating;
selecting a virtual chain to complete the task from among the two or more virtual chains in accordance with the resolving;
reserving a set of elements associated with the selected virtual chain; and
performing the selected virtual chain to achieve the objective by communicating with at least the two or more elements associated with the single system.

22. The method of claim 21, further comprising:
assessing an outcome of the performed virtual chain to determine if the objective is accomplished; and
un-reserving the reserved set of elements if the objective is accomplished.

23. The method of claim 21, wherein the rating two or more of the virtual chains includes:
identifying a set of elements associated with selected ones of the established virtual chain;
identifying comparison parameters associated the set of elements;
identifying comparison values associated with the comparison parameters;
identifying a mathematical function associated with the comparison parameters; and
applying the comparison values to the mathematical function for each selected one of the established virtual chains.

24. The method of claim 23, wherein the mathematical function is a cost function.

25. The method of claim 23, wherein the comparison parameters are selected from among a dollar cost to replace an element, a maintenance interval associated with an element, a kill radius associated with an effector element, an availability of an element at a location of interest, a length of time necessary to re-arm a system with an effector element, a reception range associated with a communications element, an accuracy of a sensor element, a time to transport an element, a cost of resources needed to transport an element, and a cost to transport an element.

26. The method of claim 21, wherein the set of virtual chains includes a set of war-fighting execution chains and the objective is a war-fighting execution objective.

27. The method of claim 21, wherein the set of virtual chains includes a set of non-combat logistics execution chains and the objective is a non-combat logistics execution objective.

28. The method of claim 27, further comprising communicating the non-combat logistics planning execution objective to at least one of a contracting office, a material control office, and an element supplier.

29. The method of claim 21, wherein the set of virtual chains includes a set of war-fighting planning chains and the objective is a war-fighting planning objective.

30. The method of claim 21, wherein the set of virtual chains includes a set of non-combat logistics planning chains and the objective is a non-combat logistics planning objective.

31. Apparatus, comprising:
a war-fighting execution service comprising a war-fighting policy-driven execution module configured to operate upon at least one of a war-fighting rule, a war-fighting constraint, a war-fighting objective, or a war-fighting persistent situational awareness, and to provide at least one war-fighting execution chain having a combination of war-fighting elements, wherein at least two of the war fighting elements within one of the at least one war-fighting execution chain are associated with a first military system and another at least two of the war fighting elements within the one of the at least one war-fighting execution chain are associated with a second military system.

32. The apparatus of claim 31, wherein the war-fighting elements are selected from among a war-fighting communications element, a war-fighting sensor element, a war-fighting effector element, a war-fighting platform element, and a war-fighting command and control element.

33. The apparatus of claim 31, further comprising:
a logistics execution service comprising a logistics policy-driven execution module configured to operate upon at least one of a non-combat logistics rule, a non-combat logistics constraint, a non-combat logistics objective, or a non-combat logistic persistent situational awareness, and configured to provide at least one non-combat logistics execution chain having a combination of logistics elements, wherein at least two of the logistics elements within one of the at least one non-combat logistics execution chain are associated with a single logistics system.

34. The apparatus of claim 33, wherein the logistics elements are selected from among a logistics communications element, a logistics sensor element, a logistics effector element, a logistics platform element, and a logistics command and control element.

35. The apparatus of claim 31, further comprising a planning service comprising at least one of:
a war-fighting planning service having a war-fighting policy-driven planning module configured to operate upon at least one of a war-fighting rule, a war-fighting constraint, a war-fighting objective, or a war-fighting persistent situational awareness, and configured to provide at least one war-fighting planning chain having a combination of war-fighting elements, wherein at least two of the war fighting elements within one of the at least one war-fighting execution chain are associated with a first military system and another at least two of the war fighting elements within the one of the at least one war-fighting execution chain are associated with a second military system; or
a logistics planning service having a logistics policy-driven planning module configured to operate upon at least one of a non-combat logistics rule, a non-combat logistics constraint, a non-combat logistics objective, and a non-combat logistics persistent situational awareness, and to provide at least one non-combat logistics planning chain having a combination of logistics elements, wherein at least two of the logistics elements within one of the at least one logistics planning chain are associated with a single logistics system.

36. The apparatus of claim 35, wherein the war-fighting elements are selected from among a war-fighting communications element, a war-fighting sensor element, a war-fighting effector element, a war-fighting platform element, and a war-fighting command and control element.

37. The apparatus of claim 35, wherein the logistics elements are selected from among a logistics communications element, a logistics sensor element, a logistics effector element, a logistics platform element, and a logistics command and control element.

38. Apparatus, comprising:
a logistics execution service comprising a logistics policy-driven execution module configured to operate upon at least one of a non-combat logistics rule, a non-combat logistics constraint, or a non-combat logistics objective and to provide at least one non-combat logistics execution chain having a combination of logistics elements, wherein at least two of the logistics elements within one of the at least one logistics execution chain are associated with a single logistics system.

39. The apparatus of claim 38, wherein the logistics elements are selected from among a logistics communications element, a logistics sensor element, a logistics effector element, a logistics platform element, and a logistics command and control element.

40. The apparatus of claim 38, further comprising a planning service comprising at least one of:
a war-fighting planning service having a war-fighting policy-driven planning module configured to operate upon at least one of a war-fighting rule, a war-fighting constraint, a war-fighting objective, or a war-fighting persistent situational awareness, and configured to provide at least one war-fighting planning chain having a combination of war-fighting elements, wherein at least two of the war fighting elements within one of the at least one war-fighting planning chain are associated with a first military system and another at least two of the war fighting elements within the one of the at least one war-fighting planning chain are associated with a second military system; or
a logistics planning service having a logistics policy-driven planning module adapted configured to operate upon at least one of a non-combat logistics rule, a non-combat logistics constraint, a non-combat logistics objective, or a non-combat logistics persistent situational awareness, and configured to provide at least one non-combat logistics planning chain having a combination of logistics elements, wherein at least two of the logistics elements within one of the at least one non-combat logistics planning chain are associated with a single logistics system.

41. The apparatus of claim 40, wherein the war-fighting elements are selected from among a war-fighting communications element, a war-fighting sensor element, a war-fighting effector element, a war-fighting platform element, and a war-fighting command and control element.

42. The apparatus of claim 40, wherein the logistics elements are selected from among a logistics communications element, a logistics sensor element, a logistics effector element, a logistics platform element, and a logistics command and control element.

43. Apparatus comprising a planning service comprising at least one of:
a war-fighting planning service having a war-fighting policy-driven planning module configured to operate upon at least one of a war-fighting rule, a war-fighting constraint, a war-fighting objective, or a war-fighting persistent situational awareness, and configured to provide at least one war-fighting planning chain having a combination of war-fighting elements, wherein at least two of the war fighting elements within one of the at least one war-fighting planning chain are associated with a first military system and another at least two of the war fighting elements within the one of the at least one war-fighting planning chain are associated with a second military system; and a logistics planning service having a logistics policy-driven planning module configured to operate upon at least one of a non-combat logistics rule, a non combat logistics constraint, a non-combat logistics objective, or a non-combat logistics persistent situational awareness, and to provide at least one non-combat logistics planning chain having a combination of logistics elements, wherein at least two of the logistics elements within one of the at least one non-combat logistics planning chain are associated with a single logistics system.

44. The apparatus of claim 43, wherein the war-fighting elements are selected from among a war-fighting communications element, a war-fighting sensor element, a war-fighting effector element, a war-fighting platform element, and a war-fighting command and control element.

45. The apparatus of claim 43, wherein the logistics elements are selected from among a logistics communications element, a logistics sensor element, a logistics effector element, a logistics platform element, and a logistics command and control element.

* * * * *

UNITED STATES PATENT AND TRADEMARK OFFICE
CERTIFICATE OF CORRECTION

PATENT NO. : 7,519,569 B1
APPLICATION NO. : 11/269523
DATED : April 14, 2009
INVENTOR(S) : Thomas J. Flynn et al.

It is certified that error appears in the above-identified patent and that said Letters Patent is hereby corrected as shown below:

Abstract, line 2 delete "resources provide" and replace with --resources provides--.

Column 2, line 52 delete "with description" and replace with --with the description--.

Column 3, lines 65-66 delete "on communications" and replace with --on the communications--.

Column 4, line 32 delete "on communication" and replace with --on the communications--.

Column 4, line 37 delete "communication" and replace with --communications--.

Column 4, line 41 delete "communication" and replace with --communications--.

Column 4, lines 46-47 delete "communication" and replace with --communications--.

Column 4, line 51 delete "communication" and replace with --communications--.

Column 4, lines 52-53 delete "communication" and replace with --communications--.

Column 4, line 57 delete "communication" and replace with --communications--.

Column 5, line 8 delete "accordance yet" and replace with --accordance with yet--.

Column 5, line 16 delete "accordance yet" and replace with --accordance with yet--.

Column 5, line 20 delete "logistic" and replace with --logistics--.

Column 5, line 23 delete "accordance yet" and replace with --accordance with yet--.

Column 5, line 33 delete "logistic" and replace with --logistics--.

Column 6, line 22 delete "buss," and replace with --bus,--.

Column 7, line 29 delete the first instance of "can be can be" and replace with --can be--.

UNITED STATES PATENT AND TRADEMARK OFFICE
CERTIFICATE OF CORRECTION

| | |
|---|---|
| PATENT NO. | : 7,519,569 B1 |
| APPLICATION NO. | : 11/269523 |
| DATED | : April 14, 2009 |
| INVENTOR(S) | : Thomas J. Flynn et al. |

It is certified that error appears in the above-identified patent and that said Letters Patent is hereby corrected as shown below:

Column 14, line 9 delete "combination" and replace with --combinations--.

Column 14, line 66 delete "tuck," and replace with --truck,--.

Column 15, line 6 "(CDEC) 400 The" and replace with --(CDEC) 400. The--.

Column 17, lines 65-66 delete "war fighting" and replace with --war-fighting--.

Column 17, line 66 delete "war fighting" and replace with --war-fighting--.

Column 17, line 67 delete "date," and replace with --data,--.

Column 20, line 32 delete "associated the set" and replace with --associated with the set--.

Column 21, lines 12-13 delete "war fighting" and replace with --war-fighting--.

Column 21, line 15 delete "war fighting" and replace with --war-fighting--.

Column 21, line 29 delete "logistic" and replace with --logistics--.

Column 21, line 50 delete "war fighting" and replace with --war-fighting--.

Column 21, lines 52-53 delete "war fighting" and replace with --war-fighting--.

Column 22, line 33 delete "war fighting" and replace with --war-fighting--.

Column 22, lines 35-36 delete "war fighting" and replace with --war-fighting--.

Column 22, line 40 delete "adapted configured" and replace with --configured--.

Column 23, line 1 delete "war fighting" and replace with --war-fighting--.

UNITED STATES PATENT AND TRADEMARK OFFICE
CERTIFICATE OF CORRECTION

PATENT NO.        : 7,519,569 B1
APPLICATION NO.   : 11/269523
DATED             : April 14, 2009
INVENTOR(S)       : Thomas J. Flynn et al.

It is certified that error appears in the above-identified patent and that said Letters Patent is hereby corrected as shown below:

Column 23, lines 3-4 delete "war fighting" and replace with --war-fighting--.

Signed and Sealed this

Twenty-ninth Day of September, 2009

David J. Kappos
*Director of the United States Patent and Trademark Office*